US008423357B2

(12) United States Patent
Kulakcherla et al.

(10) Patent No.: US 8,423,357 B2
(45) Date of Patent: Apr. 16, 2013

(54) SYSTEM AND METHOD FOR BIOMETRIC ACOUSTIC NOISE REDUCTION

(75) Inventors: Sandeep Kulakcherla, Santa Clara, CA (US); Alon Konchitsky, Santa Clara, CA (US); Alberto D Berstein, San Jose, CA (US)

(73) Assignee: Alon Konchitsky, Sunnyvale, CA (US)

( * ) Notice: Subject to any disclaimer, the term of this patent is extended or adjusted under 35 U.S.C. 154(b) by 0 days.

(21) Appl. No.: 13/161,937

(22) Filed: Jun. 16, 2011

(65) Prior Publication Data

US 2012/0004907 A1 Jan. 5, 2012

Related U.S. Application Data

(60) Provisional application No. 61/356,240, filed on Jun. 18, 2010.

(51) Int. Cl.
*G10L 21/02* (2006.01)
*G10L 11/04* (2006.01)
*G10L 19/14* (2006.01)
*G10L 15/20* (2006.01)

(52) U.S. Cl.
USPC ............ 704/226; 704/207; 704/224; 704/233

(58) Field of Classification Search ........................ None
See application file for complete search history.

(56) References Cited

U.S. PATENT DOCUMENTS

| | | | | |
|---|---|---|---|---|
| 5,651,071 | A * | 7/1997 | Lindemann et al. | 381/314 |
| 5,812,970 | A * | 9/1998 | Chan et al. | 704/226 |
| 6,366,880 | B1 * | 4/2002 | Ashley | 704/226 |
| 6,477,489 | B1 * | 11/2002 | Lockwood et al. | 704/200.1 |
| 7,860,708 | B2 * | 12/2010 | Kim | 704/207 |
| 7,925,502 | B2 * | 4/2011 | Droppo et al. | 704/226 |
| 8,315,862 | B2 * | 11/2012 | Kim et al. | 704/226 |
| 2005/0165603 | A1 * | 7/2005 | Bessette et al. | 704/200.1 |
| 2006/0098809 | A1 * | 5/2006 | Nongpiur et al. | 379/406.14 |
| 2006/0178876 | A1 * | 8/2006 | Sato et al. | 704/225 |
| 2008/0234959 | A1 * | 9/2008 | Joublin et al. | 702/75 |
| 2008/0281589 | A1 * | 11/2008 | Wang et al. | 704/226 |
| 2010/0260354 | A1 * | 10/2010 | Ozawa | 381/94.4 |

* cited by examiner

*Primary Examiner* — Brian Albertalli
(74) *Attorney, Agent, or Firm* — Steven A. Nielsen; Allman & Nielsen, P.C.

(57) ABSTRACT

Embodiments of the invention provide a communication device and methods for generating enhanced audio signals. An audio signal comprising a speech signal and a noise signals is acquired at the communication device. A noise processor of the communication device detects a pitch estimation of the audio signal. Thereafter, the audio signal is processed based on the pitch estimation and processing parameters of the audio signals to remove noise signals and generate an enhanced audio signal.

14 Claims, 13 Drawing Sheets

SYSTEM AND METHOD FOR BIOMETRIC ACOUSTIC NOISE REDUCTION

CROSS REFERENCE TO RELATED APPLICATION

This application is a US Non-Provisional Application of a U.S. Provisional Application Ser. No. 61/356,240 entitled 'Biological Acoustic Noise Reduction' and filed on Jun. 18, 2010. The entire teachings of the above application are incorporated herein by reference.

FIELD OF THE INVENTION

The invention relates to signal processing and more specifically the invention relates to methods and systems for reducing noise in a signal at a communication device.

BACKGROUND

Various communication devices such as a cell phone, a mobile phone, a Personal Desktop Assistant (PDA) or a wireless telephone may be used for communication over telecommunication network or the Internet. The communication devices may be used at home, office, inside a car, train, airport, beach, restaurants and bars, street, and almost any other venue that may have variable levels of environmental noise. The environmental noise may be picked up from a microphone of a communication device and may degrade quality of speech signals transmitted or received at the communication device. As a result, in an ongoing call the speech of a caller may be unintelligible to a receiver. Further, the communication device may use more bandwidth or network capacity when there is noise in environment, especially during non-speech segments in a two-way conversation when a user is not speaking. Consequently, noise reduction and improvement in Signal-to-Noise Ratio (SNR) may be performed prior to transmitting the signals from the communication device.

Pitch of a signal such as speech signal is an acoustic parameter for speech recognition, compression, and synthesis. The pitch plays a significant role in both production and perception of the speech. Generally, the pitch is perceived with great accuracy at a fundamental frequency that characterizes the vibrations of speaker's vocal chords. The speech signal is a quasi-periodic or a virtually periodic signal. Therefore, harmonic components of the speech signal are present at integer multiples of the fundamental frequency.

Various techniques for noise reduction employ Pitch Detection Algorithm (PDA) to estimate the pitch or the fundamental frequency of the speech signal. PDA may be used in the time domain to estimate the period of the quasi-periodic signal, and then invert that value to generate the frequency of the signal. One approach for pitch estimation may be to measure the distance between zero crossing points of the signal (i.e. the Zero Crossing Rate). However, this technique may not be effective in case of complex waveforms including multiple sine waves with differing periods. However, zero-crossing techniques may be in some cases, for example in speech applications where a single source of sound is considered. This technique is simple and inexpensive, however, it may be inaccurate and generate noisy signals.

Further, PDA may be used in frequency domain for polyphonic detection. The Fast Fourier Transform (FFT) may be used to convert the signal to a frequency spectrum. Various frequency domain algorithms include the harmonic product spectrum, cepstral analysis, or maximum likelihood which attempt to match the frequency domain characteristics of the signal to pre-defined frequency maps. The FFT algorithm is efficient and can be applied in various scenarios. However, processing power required increases with the desired accuracy of the signal. The frequency domain based PDA may be less expensive, resistant to noise, and adjustable to different kind of inputs as compared to time domain based analysis. However, in this case, low pitches may be tracked less accurately than high pitches.

Pitch of a signal is a perceptive parameter and not a physical parameter. For a single sinusoid, below mentioned Equation 1 defines the relation between the frequency 'F' and the pitch 'P' of the signal in the harmonic scale:

$$P(F) = P_{ref} + O\log_2\left(\frac{F}{F_{ref}}\right) \qquad \text{Equation 1}$$

where '$P_{ref}$' and '$F_{ref}$' are the pitch and the corresponding frequency respectively of a tone of reference. The constant 'O' is the division of the octave. For example, a value of O as 12 leads to the classic dodecaphonic musical scale. This technique is computationally inexpensive, reasonably resistant to noise, adjustable to different kind of inputs. However, low pitches may be tracked less accurately than high pitches.

Various techniques are available for noise reduction. In case of multi-microphone techniques, more than two microphones results in effective noise reduction. However, the communication devices pose spatial restrictions on use of multiple microphones. Further, under a stationary noise environment such as fan or motor noise, a spectral subtraction method may be utilized for the noise reduction. In this technique, noise spectrum to be subtracted is obtained during non-speech activity. Therefore, non-stationary noise may not be removed. In monaural approach, the noise reduction is based on discrimination between properties of the voice and the noise. The spectrum of voiced sounds include harmonic components that are integer multiples of the fundamental frequency. An existing technology such as comb filter method may be used for the noise reduction. However, in case of comb filter method, a detection error in the fundamental frequency may degrade the quality of the filtered voice.

A true fundamental frequency of the signal may be determined from several possible frequencies using time continuity. Another existing technique uses time continuity property of both power spectrum envelopes (PSE) and the fundamental frequency to estimate the true fundamental frequency. Further, the reliable fundamental frequency may be determined by using continuity of power spectrum envelopes due to quasi stationary characteristics of the human voice. However, the fundamental frequency extracted from the noisy signal may include fluctuations because of noise interference. Therefore, the fundamental frequency is adopted from both the latest frequency and the predicted frequency so as to keep the continuity in the frequency. Moreover, the comb filtering for continuous speech with noise often generates strange sounds because the harmonic structure at higher frequency is disturbed by the noise.

Another existing technique as disclosed in U.S. Pat. No. 6,415,034 uses multiple microphones for noise cancellation. However, noise may leak past an ear capsule of the microphone and enter into a speech microphone. Further, the technique requires complex, power consuming and expensive digital circuitry, which may not be suitable for portable, battery powered devices such as mobile phones.

Another existing technique for reducing noise as disclosed in U.S. Pat. No. 5,969,838 utilizes two fiber optic microphones placed side-by-side to each other. However, the technology uses light guides and other relatively expensive and/or fragile components that may not be suitable for communication devices. Yet another technique as disclosed in U.S. Pat. No. 5,406,622 uses two adaptive filters for noise reduction. One of the adaptive filters is driven by a transmitter of the communication device to subtract speech signal from a reference value to produce an enhanced reference signal. Another adaptive filter is driven by the enhanced reference signal to subtract noise from a transmitter of the communication device. However, the technique requires accurate detection of speech and non-speech regions in the speech signal. Therefore, an incorrect detection of the speech and the non-speech region may degrade the performance of noise reduction.

Another technique for noise cancellation includes passive expander circuits that are used in the electret-type telephonic microphone. However, only low level noise that occurs during periods when speech is not present may be reduced. Further, passive noise-canceling microphones may be used to reduce the background noise. However, passive noise-canceling microphones have a tendency to attenuate and distort the speech signal when the microphone is not in close proximity to the user's mouth. Moreover, such microphones are effective only in a frequency range up to about 1 kHz.

Active noise-cancellation circuitry may be used to reduce background noise. In this case, a noise-detecting reference microphone and adaptive cancellation circuitry are used to generate a continuous replica of the background noise signal that is subtracted from the total background noise signal. However, this technique may be susceptible to cancellation degradation because of a lack of coherence between the noise signal received by the reference microphone and the noise signal impinging on the transmit microphone. Further, the performance may vary based on the directionality of the noise and may tend to attenuate or distort the speech.

Therefore, techniques for noise reduction of a speech signal at a communication device are desired.

SUMMARY

Embodiments of the invention provide a communication device for generating enhanced audio signals. The communication device comprising at least one microphone and a noise processor. The at least one microphone is configured to acquire an audio signal, wherein the audio signal comprises at least one speech signal and at least one noise signal. The noise processor is configured to: detect a pitch estimation of the audio signal, initialize a plurality of processing parameters for the audio signal, and process the audio signal based on the pitch estimation and the processing parameters, wherein the audio signal is processed to reduce the at least one noise signal and generate an enhanced audio signal.

Embodiments of the invention provide a method for generating enhanced audio signals at a communication device. The method comprising: acquiring by one or more microphones of the communication device an audio signal, wherein the audio signal comprises at least one speech signal and at least one noise signal. Further, the method comprises detecting, at a noise processor, a pitch estimation of the audio signal, initializing, at a noise processor, a plurality of processing parameters for the audio signal, and processing, at the noise processor, the audio signal based on the pitch estimation and the processing parameters, wherein the audio signal is processed to reduce the at least one noise signal and generate an enhanced audio signal.

Embodiments of the invention further provide a communication device for transmitting enhanced audio signals. The communication device comprising at least one microphone configured to acquire an audio signal, wherein the audio signal comprises at least one speech signal and at least one noise signal; and a noise processor configured to: detect a pitch estimation of the audio signal, initialize a plurality of indices for a Fast Fourier Transform (FFT) of the audio signal, decrease the pitch estimation value based on a fundamental frequency of the audio signal based on a first predefined condition, and multiplying the pitch estimation value with at least one of the plurality of processing parameters to generate an enhanced audio signal, and a transmitter configured to transmit the enhances audio signal over a communication channel.

In one aspect of the invention, an enhanced experience is provided for using a cellular telephone or other wireless communications devices, even at a location with high background or environmental noise.

In another aspect of the invention, the background noise is reduced before the being transmitted to a second party over the communication channel.

In still another aspect of the invention, the communication device comprises a switch to enable and/or disable the noise reduction.

BRIEF DESCRIPTION OF THE DRAWINGS

Figure 1:
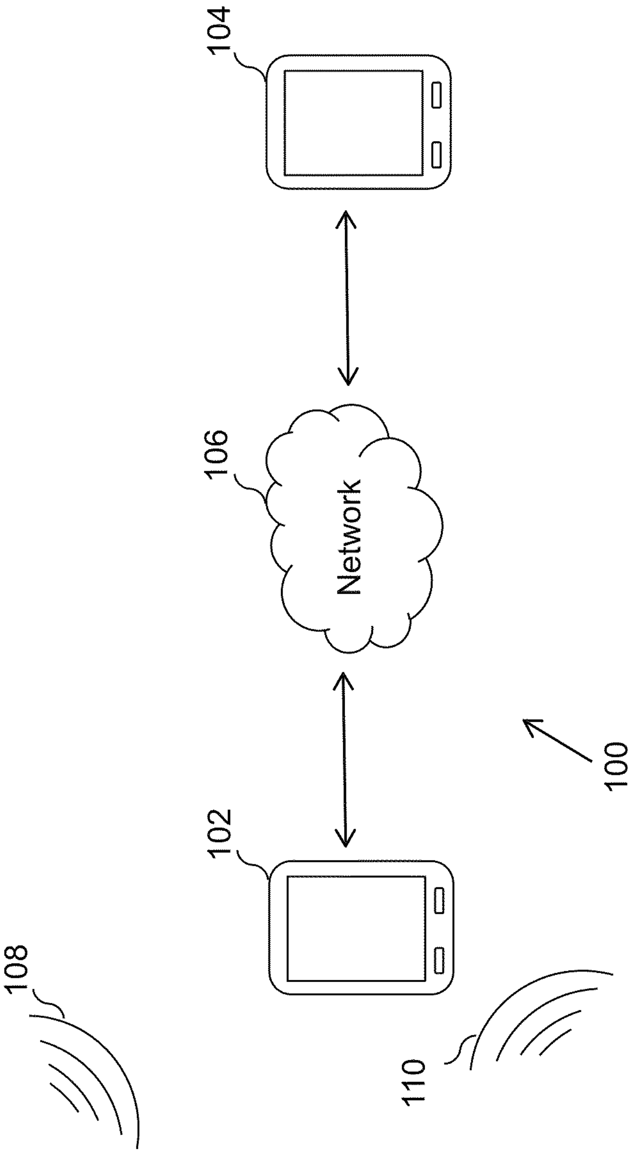
Figure 2:
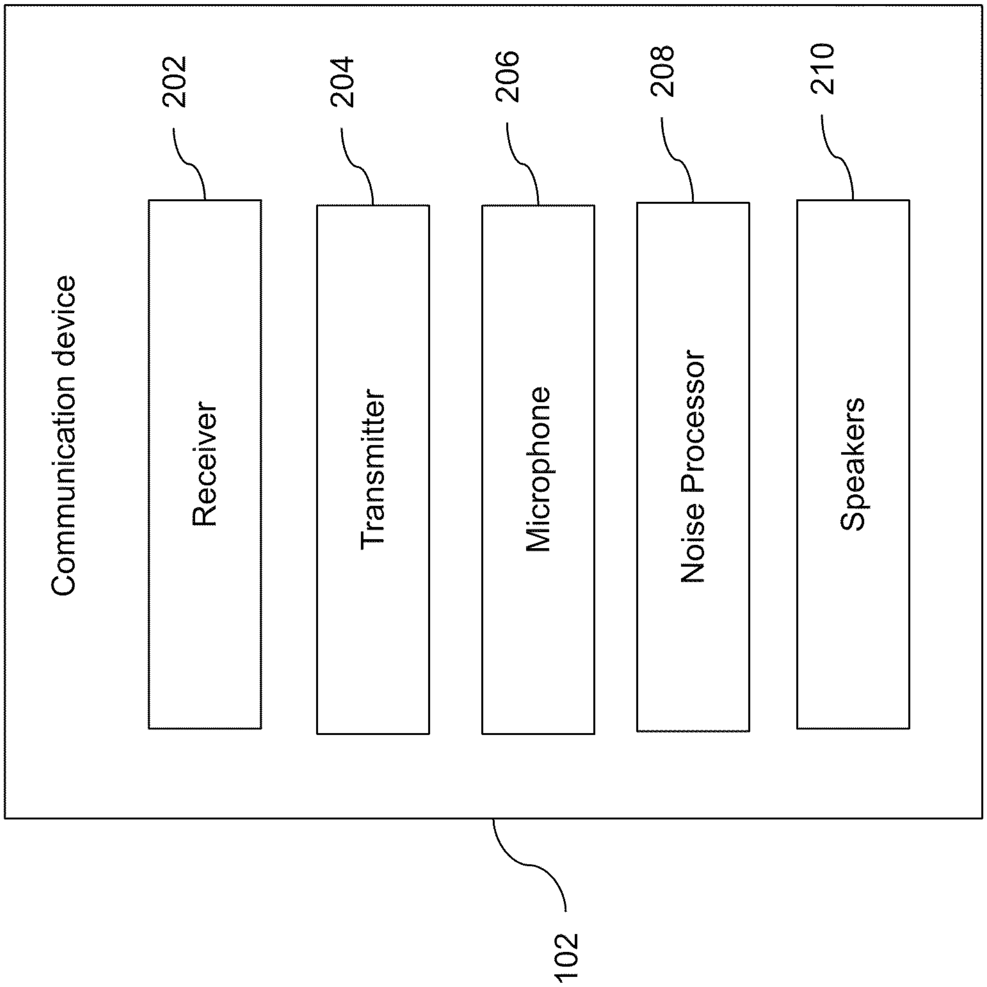
Figure 3:
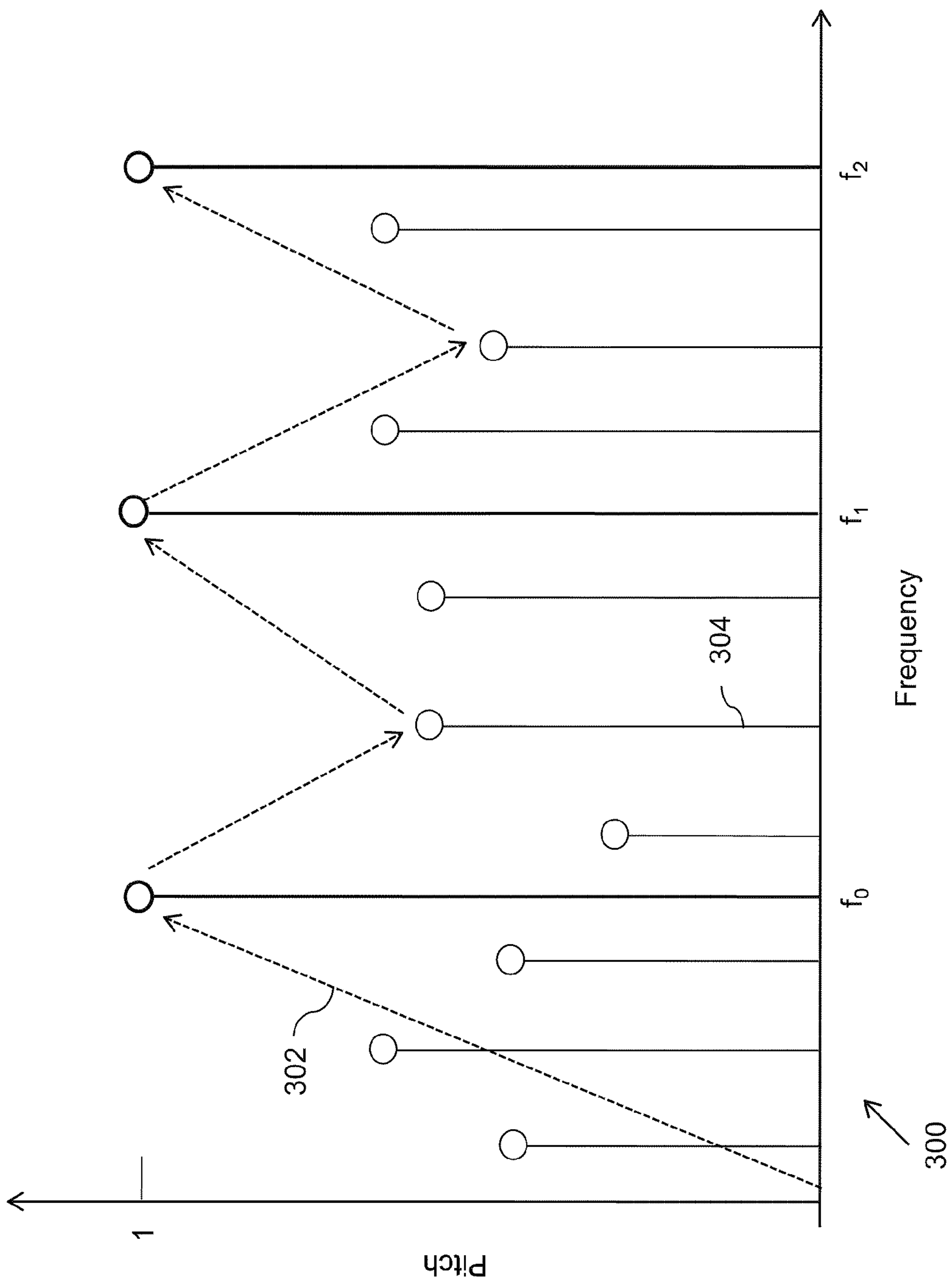
Figure 4:
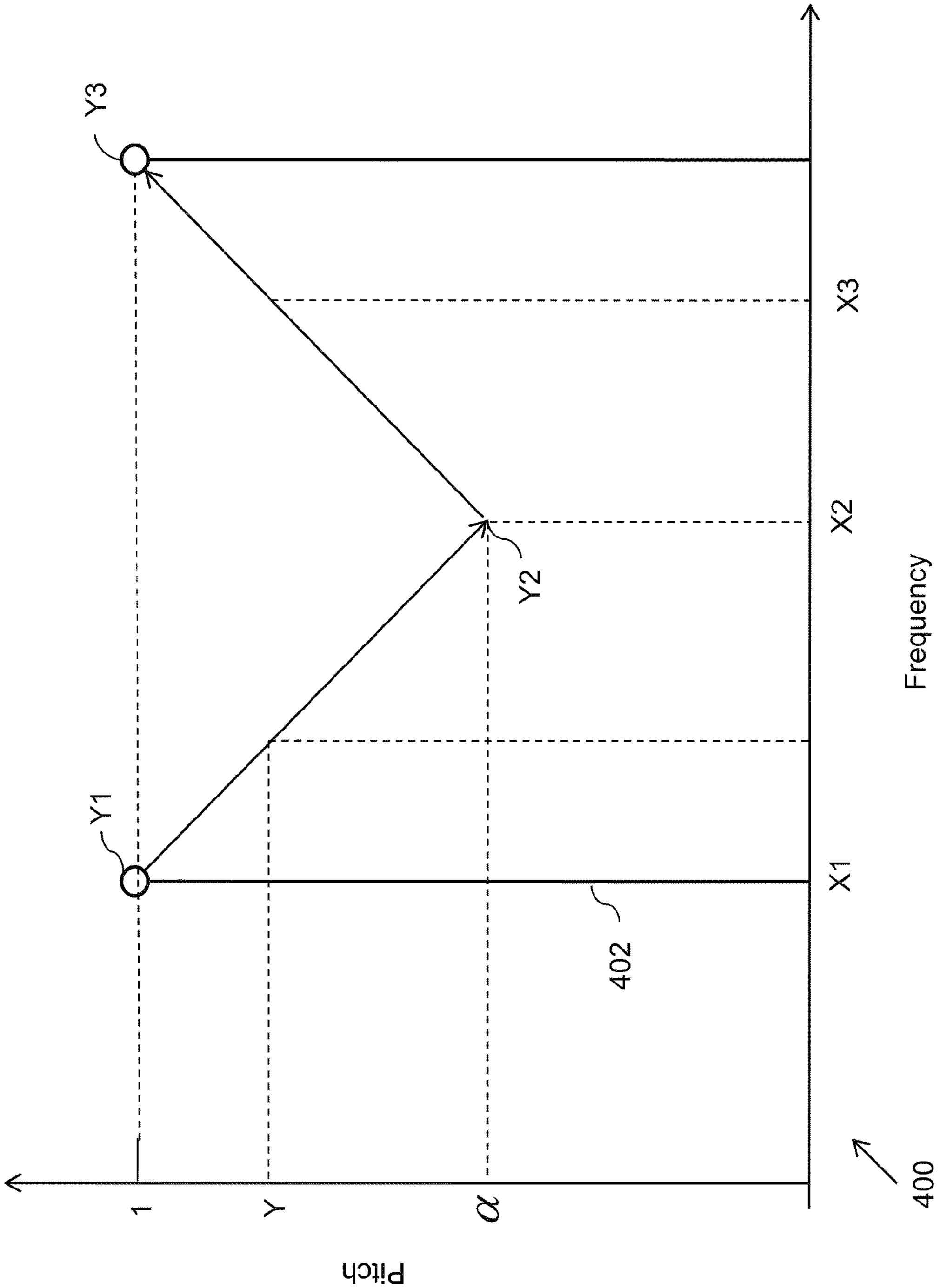
Figure 5:
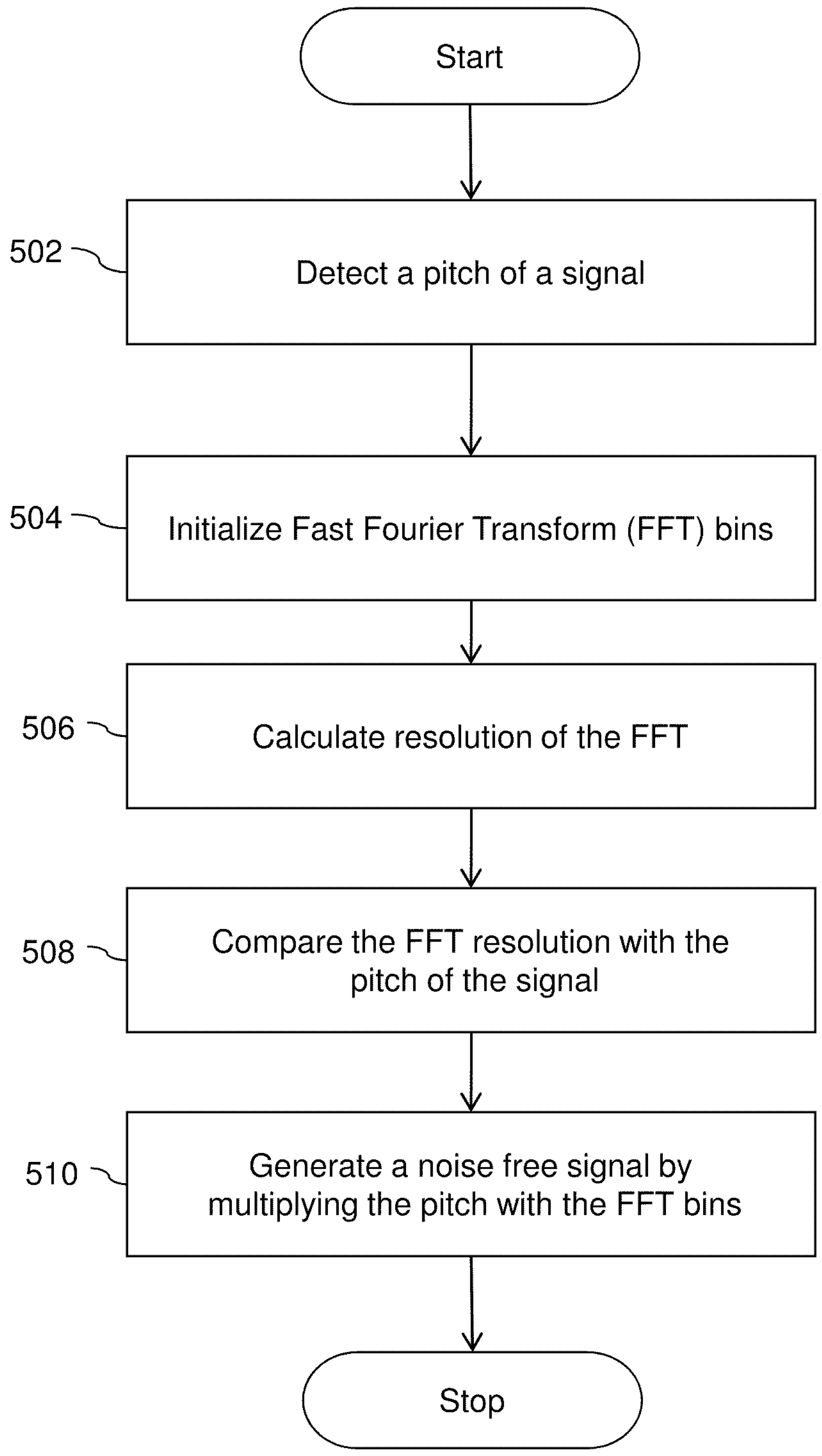
Figure 6A:
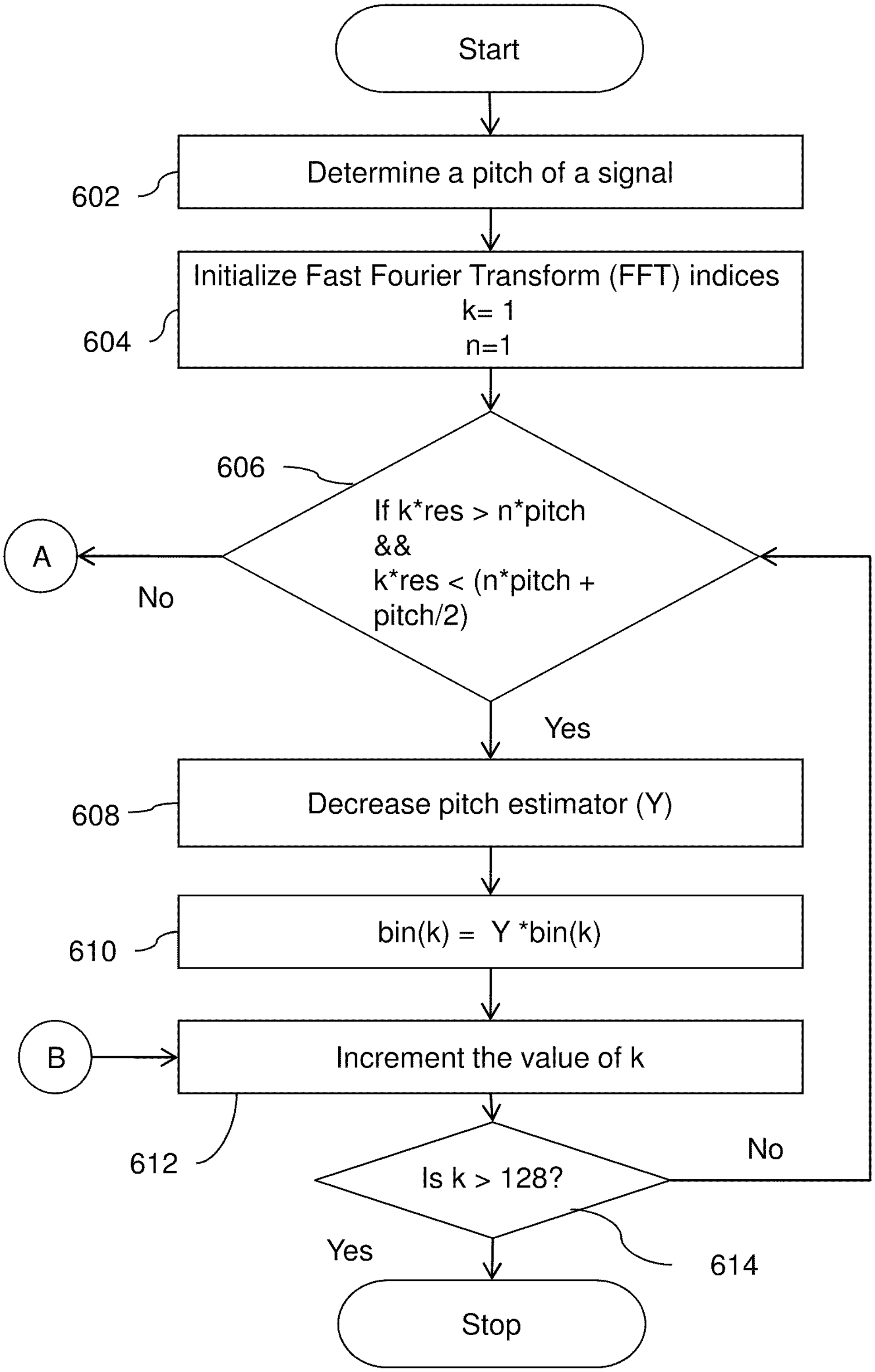
Figure 6B:
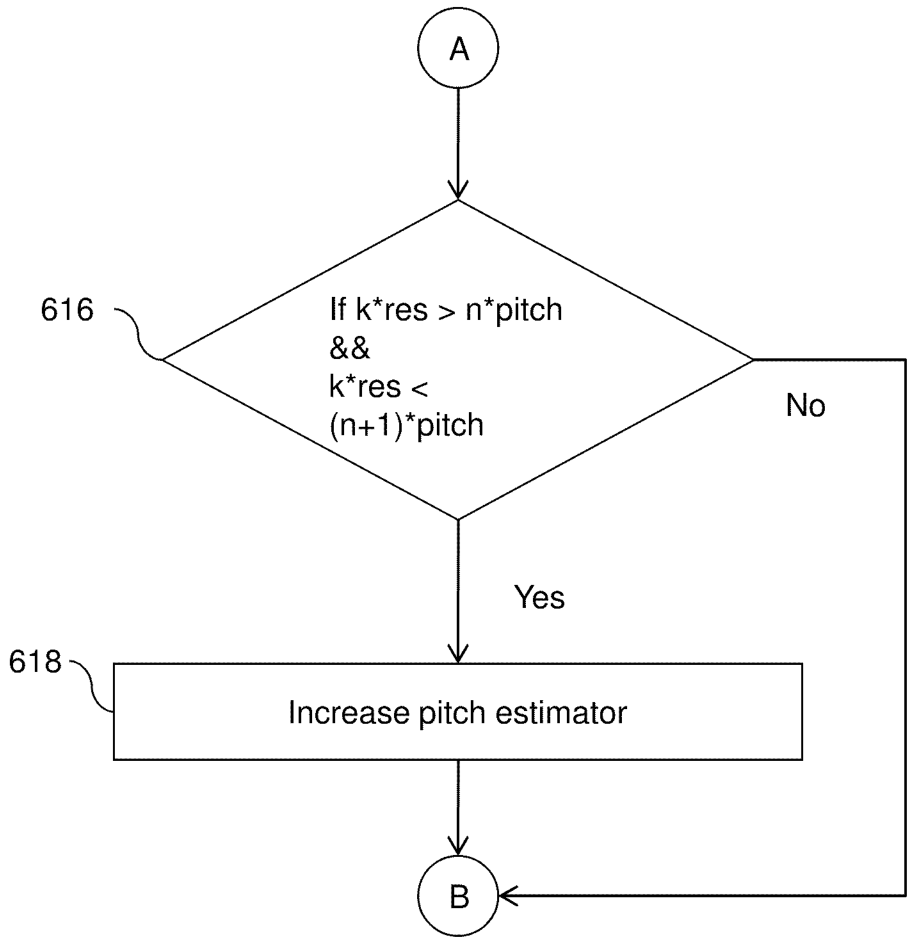
Figure 7:
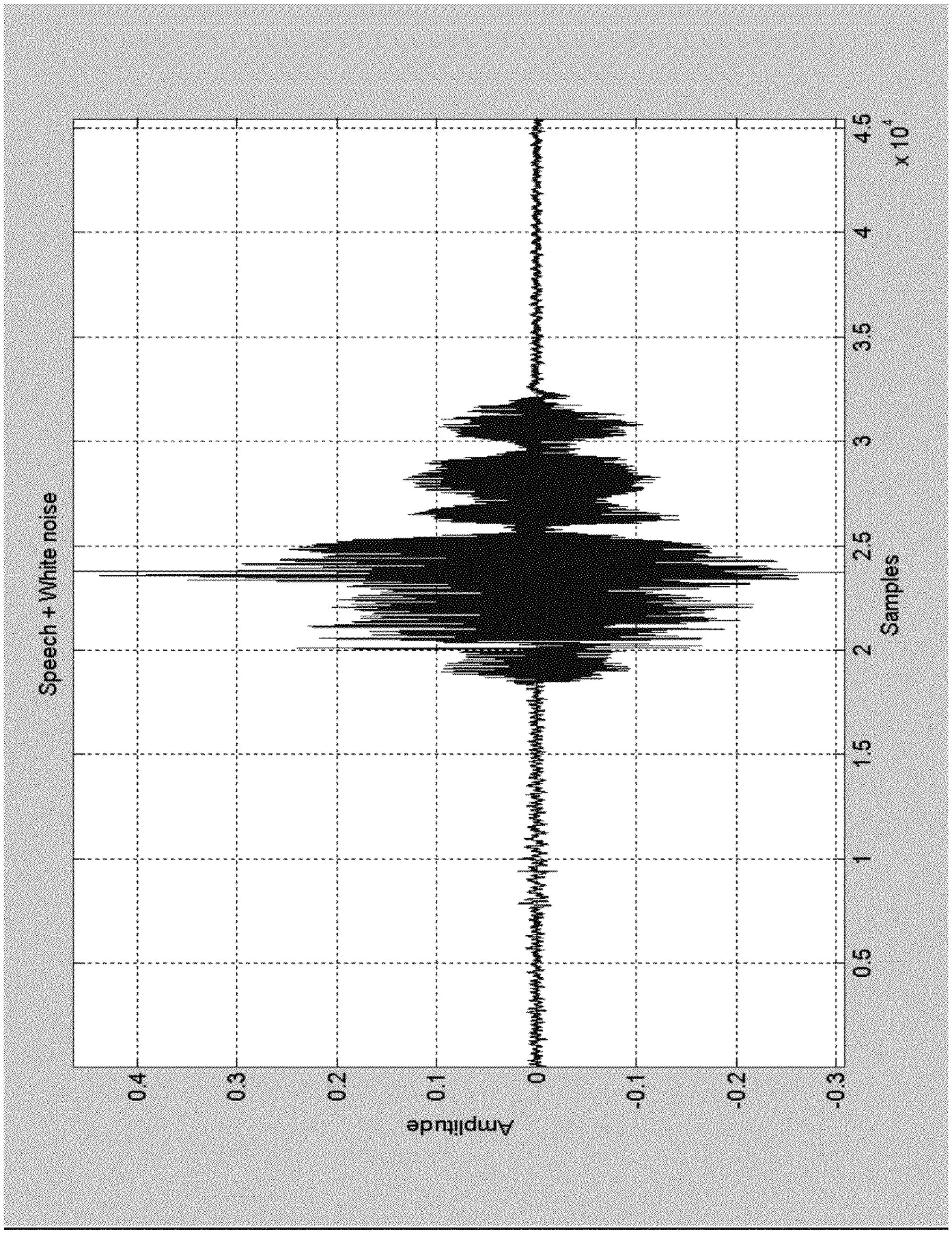
Figure 8:
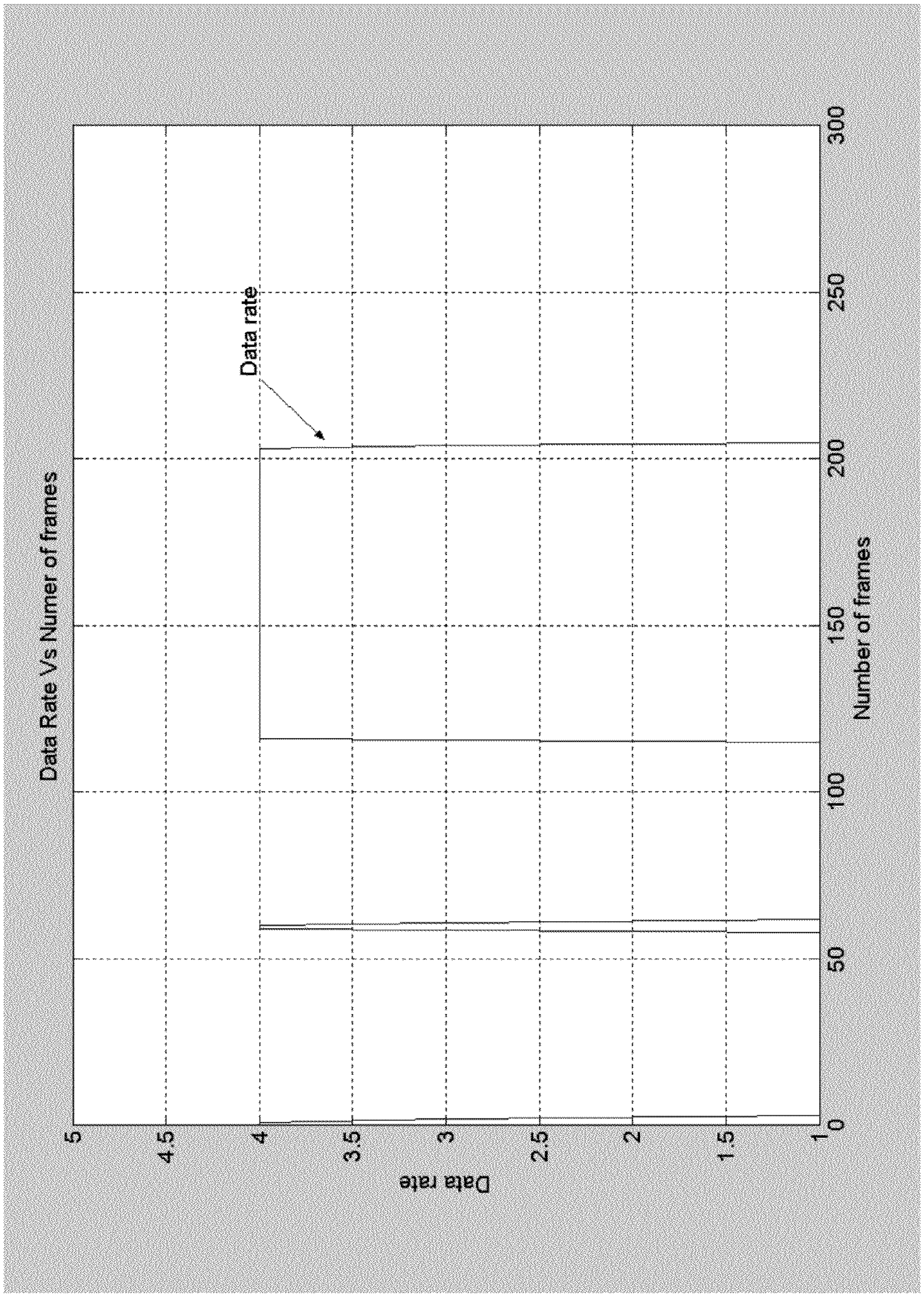
Figure 9:
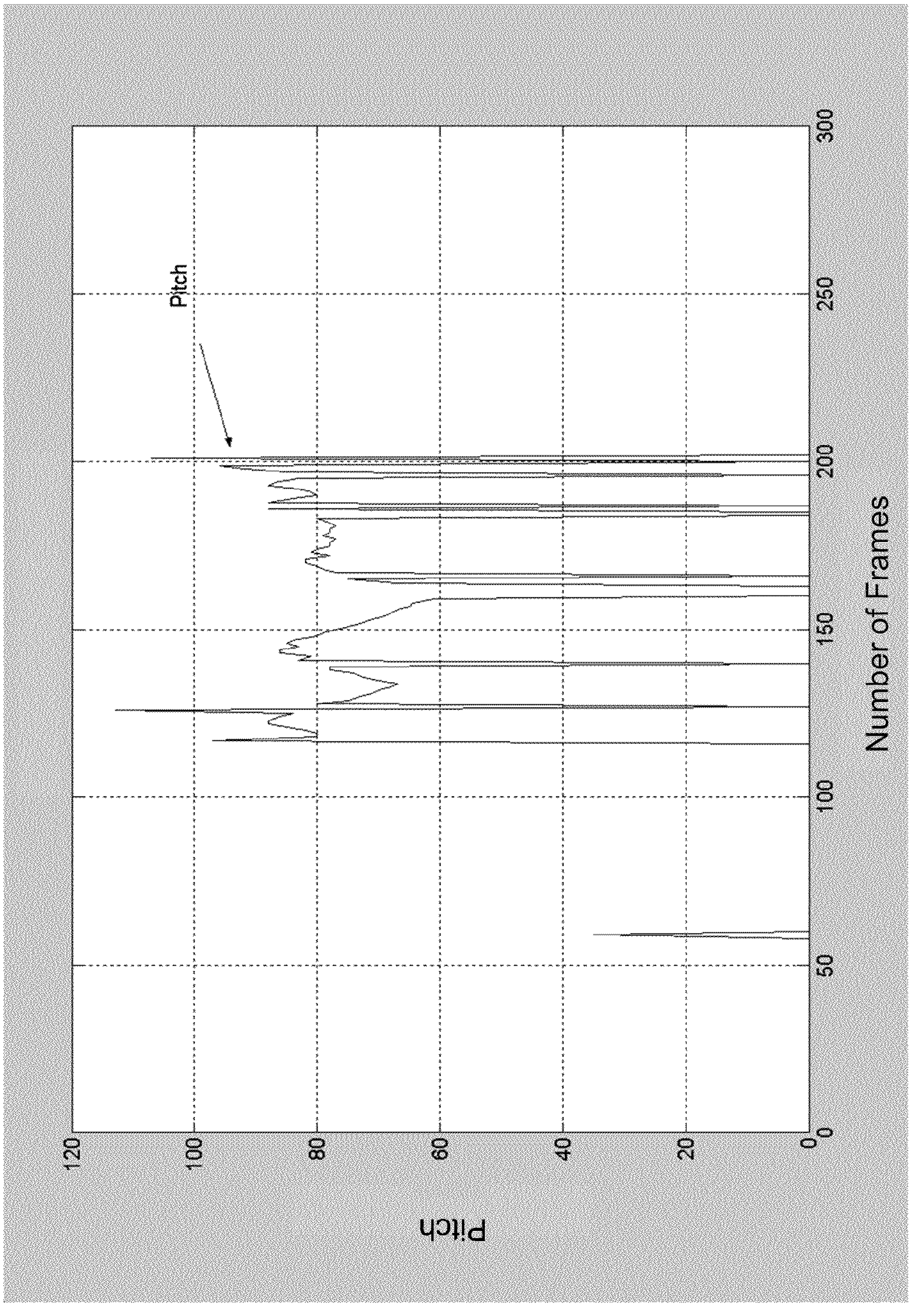
Figure 10:
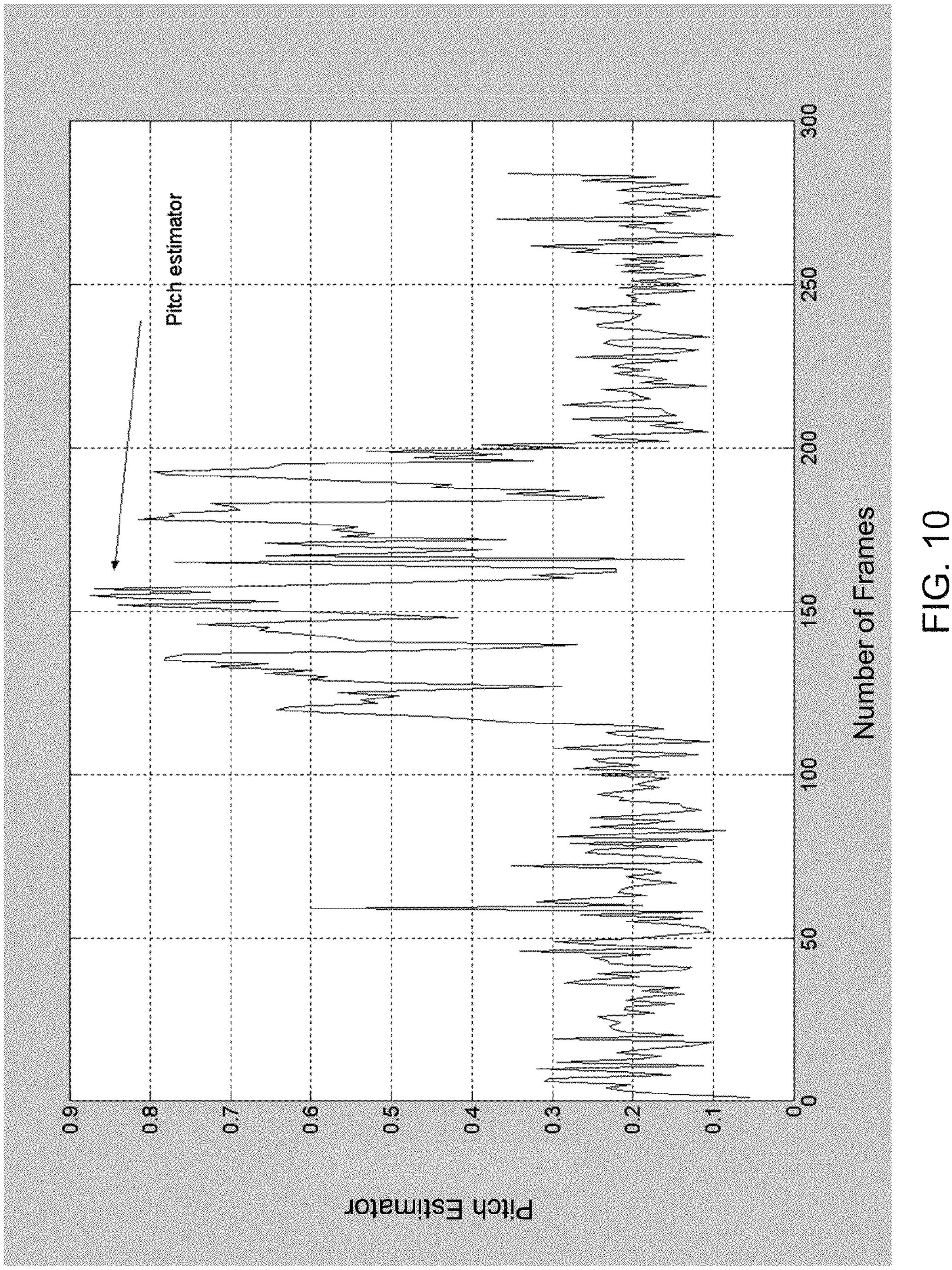
Figure 11:
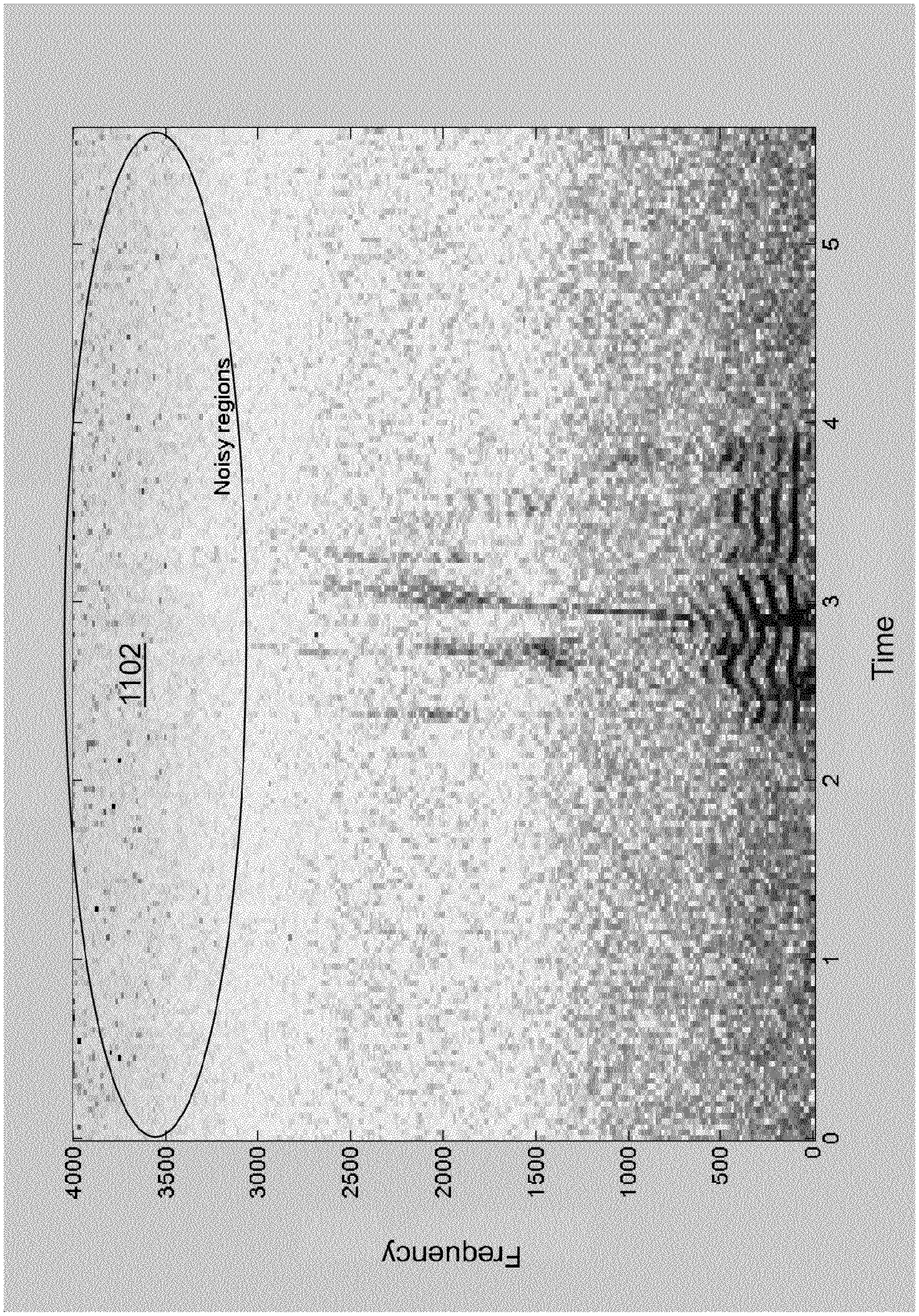
Figure 12:
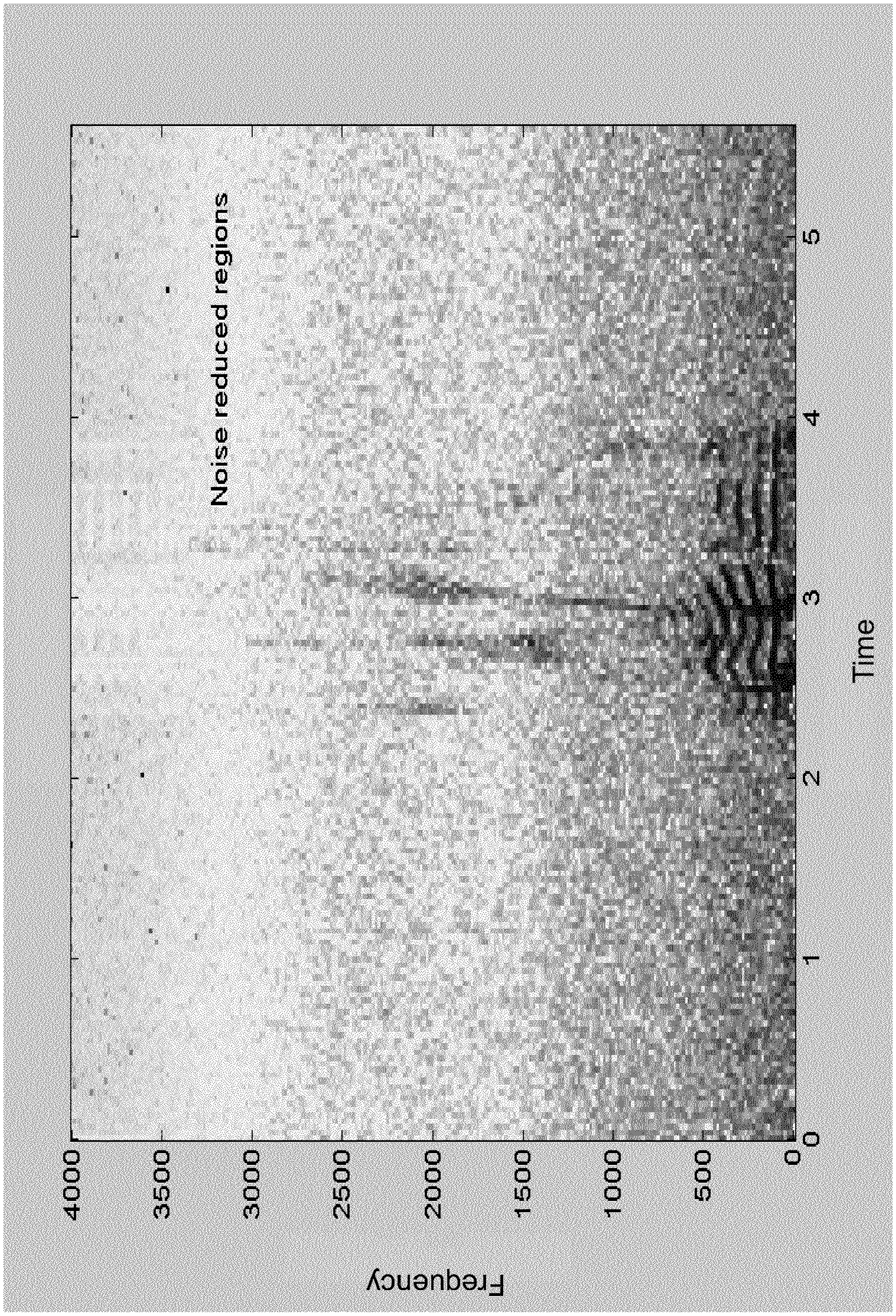

Having thus described the invention in general terms, reference will now be made to the accompanying drawings, which are not necessarily drawn to scale, and wherein:

FIG. 1 illustrates an environment where various embodiments of the invention function;

FIG. 2 illustrates components of a communication device for reducing noise in communication signals, in accordance with an embodiment of the invention;

FIG. 3 is an exemplary graph of pitch for a signal having noise, in accordance with an embodiment of the invention;

FIG. 4 illustrates an exemplary graph for the pitch corresponding to the frequency of a clear voice signal, in accordance with an embodiment of the invention;

FIG. 5 illustrates a flowchart for reduction of noise in a signal, in accordance with an embodiment of the invention;

FIG. 6 illustrates another flowchart for reduction of noise in a signal, in accordance with an embodiment of the invention;

FIG. 7 is an exemplary diagram illustrating amplitude corresponding to samples of a speech signal mixed with a noise signal;

FIG. 8 is an exemplary diagram illustrating a data rate of the noisy speech signal corresponding to the number of frames;

FIG. 9 is an exemplary diagram illustrating the pitch of the signal corresponding to the number of frames;

FIG. 10 is an exemplary diagram illustrating the value of pitch estimator corresponding to the number of frames, in accordance with an embodiment of the invention;

FIG. 11 is an exemplary diagram illustrating a spectrogram of the noisy speech signal before noise reduction; and FIG. 12 is an exemplary diagram illustrating the spectrogram of the noisy speech signal after noise reduction, in accordance with an embodiment of the invention.

DETAILED DESCRIPTION OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout. Unless otherwise noted in this specification or in the claims, all of the terms used in the specification and the claims will have the meanings normally ascribed to these terms by workers in the art.

The present invention provides systems and methods to improve the intelligibility in noisy environments experienced in communication devices such as a cellular telephone, wireless telephone, cordless telephone, and so forth. While the present invention has applicability to at least these types of communications devices, the principles of the present invention are particularly applicable to all types of communications devices, as well as other devices that process speech in noisy environments such as voice recorders, dictation systems, voice command and control systems, and the like. For simplicity, the following description may employ the terms “telephone” or “cellular telephone” as an umbrella term to describe the embodiments of the present invention, but those skilled in the art will appreciate that the use of such term is not to be considered limiting to the scope of the invention, which is set forth by the claims appearing at the end of this description.

FIG. 1 illustrates an environment 100 where various embodiment of the invention function. As shown, environment 100 includes communication devices 102 and 104 which may communicate over a network 106. Examples of communication devices 102 and 104 include, but are not limited to, a mobile phone, a smart phone, a Personal Desktop Assistant (PDA), a laptop, a tablet computer (PC), and so forth. Network 106 may be for example, a Public Switched Telephone Network (PSTN), mobile network, the Internet, the Ethernet, Bluetooth network, and so forth.

Communication device 102 may be used in a noisy environment such as a hotel, a train, on a highway, an industrial setting and so forth. As shown, the noisy environment may have a background noise or noise signal 108 that may be sent along with the user speech signal 110 as a voice signal from communication device 102 to communication device 104. Background noise 108 may be reduced from the voice signal to achieve high Signal-to-Noise Ratio (SNR) based on detection of acoustic characteristics of the signals. Examples of acoustic characteristics of a signal include, but are not limited to, amplitude, period, loudness, fundamental frequency, pitch and so forth.

A pitch of a signal is a perceptual property characterizing vibration of vocal chords of a speaker. Further, the pitch may ascend or descend monotonically with frequency and may be used as parameter for signal representation and processing. Therefore, the pitch may be derived by calculation of a fundamental frequency of the voice signal. Typically, the fundamental frequency of a signal is inverse of a signal period that is a smallest repeating unit of the signal.

FIG. 2 illustrates components of communication device 102 for reducing noise in the communication signals, in accordance with an embodiment of the invention. Communication device 102 includes a receiver 202 for receiving signals from communication device 104 over network 106. Further, communication device 102 includes a transmitter 204 for transmitting signals to communication device 104 over network 106 through a communication channel. A person skilled in the art will appreciate that the functionality and circuitry of receiver 202 and transmitter 204 can be provided on a single physical component or housing.

Microphone 206 of communication device 102 picks sound signals generated at communication device 102. In an embodiment of the invention, communication device 102 may include multiple microphones 206 to pick the sound signals. Further, communication device 102 may include speakers 210 for outputting sounds. The sound signals picked by microphone 206 may be processed by a noise processor 208 to reduce and/or suppress background noise 108. In an embodiment of the invention, communication device 102 may include a button, a switch or a function to enable or disable noise processor 208. In an embodiment of the invention, noise processor 208 may be a processor that includes instructions set for processing the sound signals. The signals processed by noise processor 208 may be sent to transmitter 204 for communicating with communication device 104. A person skilled in the art will appreciate that more than one communication device 104 may be in communication with communication device 102. Therefore, transmitter 204 may transmit the signals to multiple communication device 104. Noise processor 208 may use detect the pitch in the signals to identify noise and reduce it. The pitch detection scheme implemented by noise processor 208 is explained in detail in conjunction with FIGS. 3 and 4.

In an embodiment of the invention, noise processor 208 may process the signals received from receiver 202 to reduce and/or suppress the noise in the signals. For example, in case the signals received from communication device 104 include noise, then noise processor 208 may process the received signals to output a clear signal through speakers 210. Although not shown, communication device 102 may have other components such as a display screen, one or more buttons, a memory, a processor and so forth.

FIG. 3 is an exemplary graph 300 of pitch versus frequency for a signal having noise, in accordance with an embodiment of the invention. As shown, $f_0$ is the fundamental frequency of the speech signal, and $f_1$ and $f_2$ are multiples of the fundamental frequency ($f_0$). And the other frequencies 304 may be due to noise in the signal. Noise processor 208 uses a pitch estimation function to estimate the pitch of the signal. The pitch estimation is illustrated as a pitch estimator 302 in FIG. 3.

The pitch estimation may be performed by varying a value of pitch between the frequencies. For example, as show, pitch estimator 302 decreases up to a frequency of $(f_0+f_1)/2$ and then increases after $(f_0+f_1)/2$. A same process is used for pitch between the frequencies $f_1$ and $f_2$.

For a single sinusoid, the following equation gives the relation between a frequency ‘F’ and the pitch ‘P’ in the harmonic scale (Equation (A)):

$$P(F) = P_{ref} + O\log_2\left(\frac{F}{F_{ref}}\right) \qquad \text{Equation (A)}$$

where ‘$P_{ref}$’ and ‘$F_{ref}$’ are the pitch and the corresponding frequency respectively of a tone of reference and the constant ‘O’ is the division of the octave.

FIG. 4 illustrates an exemplary graph 400 for the pitch corresponding to the frequency of a clear voice signal, in accordance with an embodiment of the invention. Graph 400 may be used to define the equations for the calculation of pitch. Further, a fundamental frequency 402 of the pure or clear voice signal is shown in graph 400. The equation for the decreasing pitch estimator is calculated as follows. The slope of the equation for pitch estimation is given by:

$$\frac{Y1-Y2}{X2-X1}=\frac{Y1-Y}{X-X1} \qquad \text{Equation (1)}$$

When Y1=1, Y2=α, X1=pitch of pure voice signal, and X2=1.5*of pure voice signal, the above equation can be rewritten as $$\frac{1-\alpha}{(1.5\ \text{pitch}-\text{pitch})}=\frac{1-Y}{X-\text{pitch}} \qquad \text{Equation (2)}$$

$$\frac{2(1-\alpha)}{\text{pitch}}=\frac{1-Y}{X-\text{pitch}}.$$

The parameter α may be a smoothing factor to avoid abrupt changes in the equation value. In an embodiment of the invention, the value of α may range from 0.125 to 0.500.

Rearranging the above equation, we get $$\frac{2(1-\alpha)(X-\text{pitch})}{\text{pitch}}=1-Y \qquad \text{Equation (3)}$$

Solving for Y, we get $$Y=1-\frac{2(1-\alpha)X}{\text{pitch}}+2(1-\alpha) \qquad \text{Equation (4)}$$

For nth fundamental frequency, the above equation becomes $$Y=1-\frac{2(1-\alpha)X}{\text{pitch}}+2(1-\alpha)n \qquad \text{Equation (5)}$$

The Equation (5) is hereafter referred to as a first predefined condition.

Similarly, the equation for increasing pitch estimator is obtained as follows:

$$\frac{2(1-\alpha)}{\text{pitch}}=\frac{1-Y}{(n)(\text{pitch})-X} \qquad \text{Equation (6)}$$

Rearranging the above equation, we get $$\frac{2(1-\alpha)[(n)(\text{pitch})-X]}{\text{pitch}}=1-Y \qquad \text{Equation (7)}$$

Solving for Y, we get $$Y=1-\frac{2(1-\alpha)\{[(n)(\text{pitch})]-X\}}{\text{pitch}} \qquad \text{Equation (8)}$$

Therefore, Y can be derived as $$Y=1+\frac{2(1-\alpha)X}{\text{pitch}}-2(1-\alpha)n \qquad \text{Equation (9)}$$

The Equation (5) is hereafter referred to as a second predefined condition. Therefore, the value of 'Y' represents the pitch of the signal at a reference frequency.

FIG. 5 illustrates a flowchart for reduction of noise in a signal, in accordance with an embodiment of the invention. A signal may be processed by noise processor 208 of communication device 102 to remove noise. At step 502, a pitch of the signal is determined. In an embodiment of the invention, the pitch of the signal is determined by using Equation (A). Thereafter, at step 504, processing parameters of indices for Fast Fourier Transform (FFT) may be initialized. In an embodiment of the invention, the initialization of the indices for FFT may be used to define the various parameters such as bins of the FFT. At step 506, resolution of the FFT may be calculated. Typically, 'N' point FFT provided 'N' frequency or FFT bins. The resolution of the FFT is given by: $F_s$/N where is N is the FFT size and $F_s$ is the sampling frequency. In an exemplary instance, in case the sampling frequency ($F_s$) is 8000 Hz a 256 (N) point FFT is used, then the resolution is 8000/256=31.25.

Thereafter, at step 508, the FFT resolution is compared with the pitch of the signal. Subsequently, at step 510, a noise free signal or a clear signal is generated by multiplying the pitch with the FFT bins. In an embodiment of the invention, the multiplication is performed if the FFT resolution matches the pitch of the signal. N another embodiment of the invention, the pitch may be varied to match the resolution and remove the noise. The variation and comparison of the pitch is explained in detail in conjunction with FIG. 6. Therefore, a noise free clear signal is generated from noise processor 208, which can be sent by transmitter 204 or outputted by speakers 210.

FIG. 6 illustrates another flowchart for reduction of noise in a signal, in accordance with an embodiment of the invention. Noise processor 208 may process the signal to remove noise based on the various parameters of the signal. At step 602, a pitch of the signal is determined by noise processor 208 of communication device 102. In an embodiment of the invention, the pitch is calculated by using Equation (A). In another embodiment of the invention, the pitch is calculated by using Equations (5) or (9). At step 604, the indices for FFT are initialized, such as bins and resolution (hereafter referred to as 'res'). Further, counters 'k' and 'n' are initialized to a specified value. In an embodiment of the invention, k and n have an initial value of 1. However, a person skilled in the art will appreciate that other values may also be selected.

At step 606, a comparison is performed between the 'res' and pitch. In case, k*res is more than n*pitch and less than (n*pitch+pitch/2), then pitch estimator (Y) 302 may be decreased, else the process is forwarded to step 616. In an embodiment of the invention, pitch estimator 302 may be decreased by using Equation 5, at step 608. Subsequently, at step 610 the value of bin of the FFT is calculated by multiplying Y with the original value of bin, i.e. bin(k)=Y*bin(k). As a result, the noise in the signal at the particular bin (or frequency) is removed. Thereafter, at step 612, the value of k is incremented. In an embodiment of the invention, the value of k is incremented by 1. However, a person skilled in the art will appreciate that other increment values are also possible.

At step 614, the value of k is compared with a predefined number. In an embodiment of the invention, the predefined number is 128. In case, the value of k is less than the predefined number then the process continues at step 604.

At step 604, in case the comparison is not satisfied then another comparison is performed at step 616. At step 616, in case, k*res is more than n*pitch and less than (n+1)*pitch, then pitch estimator 302 may be increased. At step 618, pitch estimator 302 may be increased. In an embodiment of the invention, pitch estimator 302 may be increased by using Equation 9. Thereafter, the process continues at step 612 as discussed above. In case, the condition at step 616, are not met than process continues to step 612. Therefore, each of the bins of the FFT for the signal are processed based on the estimated pitch to remove noise from the signal.

FIG. 7 is an exemplary diagram illustrating amplitude corresponding to samples of a speech signal mixed with a noise signal. As shown, the white noise is present in the signal. Further, in this example the Signal-to-Noise Ratio (SNR) may be 6 dB.

FIG. 8 is an exemplary diagram illustrating a data rate of the noisy speech signal corresponding to the number of frames. As shown, in FIG. 8, the data rate is mostly active only when the speaker is speaking.

FIG. 9 is an exemplary diagram illustrating the pitch of the signal corresponding to the number of frames. Further, the diagram illustrates that the pitch exists only when the speaker is speaking.

FIG. 10 is an exemplary diagram illustrating the value of pitch estimator corresponding to the number of frames, in accordance with an embodiment of the invention. In an embodiment of the invention, the higher value of the pitch estimator results in higher pitch detection and subsequently may be used to remove noise from the signal.

FIG. 11 is an exemplary diagram illustrating a spectrogram of the noisy speech signal before noise reduction. A region 1102 illustrates noise in the high frequency regions of the signal.

FIG. 12 is an exemplary diagram illustrating the spectrogram of the noisy speech signal after noise reduction, in accordance with an embodiment of the invention. The noise may be reduced by noise processor 208 and a noise reduced portion is shown by a region 1202. In an embodiment of the invention, the noise in the high frequency regions which mask the speech signal may be reduced to generate an enhanced or clear signal.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication device for generating enhanced audio signals, the communication device comprising:
- at least one microphone configured to acquire an audio signal, wherein the audio signal comprises at least one speech signal and at least one noise signal; and
- a noise processor configured to:
  - detect a pitch estimation of the audio signal;
  - initialize a plurality of processing parameters for the audio signal; and
  - process the audio signal based on the pitch estimation and the processing parameters, wherein the audio signal is processed to reduce the at least one noise signal and generate an enhanced audio signal;
- wherein the noise processor is further configured to:
  - decrease the pitch estimation value based on a fundamental frequency of the audio signal based on a first predefined condition;
  - increase the pitch estimation value based on a fundamental frequency of the audio signal and based on a second predefined condition; and
  - multiply the pitch estimation value with at least one of the plurality of processing parameters to generate an enhanced audio signal;
- a transmitter for transmitting the enhanced audio signal over a communication channel;
- a switch configured to:
  - enable the noise processor used for processing the audio signal to reduce at least on noise signal, and disable the noise processor used for processing the audio signal to reduce noise signal.

2. The communication device of claim 1, wherein the plurality of processing parameters comprise indices for a Fast Fourier Transform (FFT) of the audio signal.

3. The communication device of claim 2, wherein an index from the plurality of indices comprises a bin of the FFT of the audio signal.

4. A method for generating enhanced audio signals at a communication device, the method comprising:
- acquiring by one or more microphones of the communication device an audio signal, wherein the audio signal comprises at least one speech signal and at least one noise signal;
- at a noise processor:
  - detecting a pitch estimation of the audio signal;
  - initializing a plurality of processing parameters for the audio signal;
  - processing the audio signal based on the pitch estimation and the processing parameters, wherein the audio signal is processed to reduce the at least one noise signal and generate an enhanced audio signal;
  - decreasing, at the noise processor, the pitch estimation value based on a fundamental frequency of the audio signal based on a first predefined condition;
  - increasing, at the switch, the pitch estimation value based on a fundamental frequency of the audio signal based on a second predefined condition; and
  - multiplying, at the noise processor, the pitch estimation value with at least one of the plurality of processing parameters to generate an enhanced audio signal.

5. The method of claim 4 further comprising transmitting, by a transmitter, the enhanced audio signal over a communication channel.

6. The method of claim 4 further comprising enabling, by a switch, the noise processor for processing of the audio signal to reduce the at least one noise signal.

7. The method of claim 6 further comprising disabling, by a switch, the noise processor for the processing of the audio signal to reduce noise signal.

8. The method claim 4, wherein the plurality of processing parameters comprise indices for a Fast Fourier Transform (FFT) of the audio signal.

9. The method claim 8, wherein an index from the plurality of indices comprises a bin of the FFT of the audio signal.

10. A communication device for transmitting enhanced audio signals, the communication device comprising:

at least one microphone configured to acquire an audio signal, wherein the audio signal comprises at least one speech signal and at least one noise signal; and a noise processor configured to:

detect a pitch estimation of the audio signal;

initialize a plurality of indices for a Fast Fourier Transform (FFT) of the audio signal;

decrease the pitch estimation value based on a fundamental frequency of the audio signal based on a first predefined condition;

increase the pitch estimation value based on a fundamental frequency of the audio signal and a second predefined condition;

multiplying the pitch estimation value with at least one of the plurality of processing parameters to generate an enhanced audio signal; and a transmitter configured to transmit the enhances audio signal over a communication channel.

11. The communication device of claim 10 further comprising a switch configured to:

enable the noise processor for processing of the audio signal to reduce the at least one noise signal; and disable the noise processor for the processing of the audio signal to reduce noise signal.

12. The communication device of claim 10 further comprising:

a receiver for receiving an audio signal over a communication channel, wherein the audio signal comprises at least one speech signal and at least one noise signal; and the noise processor further configured to:

detect a pitch estimation of the audio signal;

initialize a plurality of processing parameters for the audio signal; and process the audio signal based on the pitch estimation and the processing parameters, wherein the audio signal is processed to reduce the at least one noise signal and generate an enhanced audio signal.

13. The communication device of claim 12 further comprising a speaker configured to output the enhanced audio signal.

14. The communication device of claim 10, wherein an index from the plurality of indices comprises a bin of the FFT of the audio signal.

* * * * *